April 13, 1937. A. O. BREDESON 2,077,035
PIPE COUPLING
Filed March 30, 1936
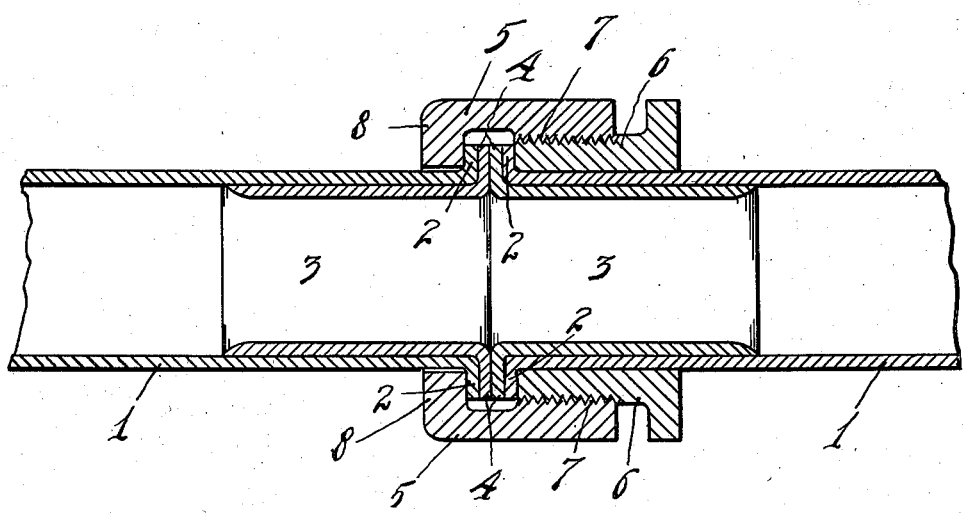
INVENTOR
ALBERT O. BREDESON
BY HIS ATTORNEYS
Merchant Kilgore Patented Apr. 13, 1937

2,077,035

UNITED STATES PATENT OFFICE 2,077,035

PIPE COUPLING

Albert O. Bredeson, Minneapolis, Minn., assignor to Super Radiator Corp., Minneapolis, Minn., a corporation of Minnesota Application March 30, 1936, Serial No. 71,645

1 Claim. (Cl. 285—127)

My present invention provides an extremely simple and highly efficient detachable leak-proof pipe coupling or union for coupling together pipes or tubes; and, generally stated, the invention consists of the novel devices, combinations of devices and arrangement of parts hereinafter described and defined in the claim.

Particularly the invention is adapted for use in connecting the abutting ends of brass, copper, or other comparatively soft pipes or tubes, but the invention, nevertheless, is also capable of connecting the abutting ends of hard metal pipes.

The invention is illustrated in the single view which is an axial section.

The pipe sections to be coupled are indicated by the numeral 1. The ends of these pipe sections are provided with out-turned annular flanges 2. Tightly driven or inserted into the ends of the pipe sections are tubular bushings 3. These bushings 3, at their ends, have out-turned annular flanges 4 that are tightly fitted against the flanges 2 of the corresponding pipe section. When the two pipe sections are coupled together, the flanges 4 of the bushings of the two pipe sections will be directly engaged. For clamping the flanges 4 directly together and pressing the flanges 2 against the adjacent flanges 4, a clamping device comprising an internally threaded nut 5 and an externally threaded sleeve 6 is provided and which elements 5 and 6 have threaded engagement at 7.

The externally threaded sleeve 6 is rotatively mounted on one of the pipe sections and its inner end engages the adjacent flange 2. The nut-acting member or collar 5 extends around and passed the flanges 2 and 4 and is provided with an inturned clamping flange 8 that engages the adjacent pipe flange 2. When the member 6 is tightly screwed into the member 5, the flanges 2 and 4 will be very tightly clamped together, as illustrated in the drawing, and a thoroughly fluid-tight joint will be formed between the engaged flanges 4 and, of course, also between the flanges 2 and 4.

The structure described is very desirable regardless of the metals or materials from which the pipe sections and bushings 3 are made. However, the said structure has this further advantage that by making the bushings of a relatively soft metal the pipe sections may be made of very hard metal. For example, the pipe sections and their flanges 2 might be made of steel and the bushings of brass, copper or even lead. The suggested relatively soft metal for the bushings and their flanges 4 will insure fluid-tight joints between the engaged flanges 4 and the flanges 4 and 2 even when the flanges are not shaped to accurate form.

In actual practice, the structure described has been found to be highly efficient for the purposes had in view.

Obviously, the bushings 3 and their flanges 4, being of soft metal, insure tight joints between the flanges 4—4 and between the flanges 4—4 and 2—2, thereby making the use of intervening packing unnecessary.

What I claim is:

The combination with pipe sections having out-turned annular end flanges, of bushings telescoped into the ends of the respective pipe sections and having out-turned annular end flanges seated against the flanges of the respective pipe sections, the two pipe sections being assembled with the end flanges of the bushings in contact, an externally threaded sleeve mounted on one of the pipe sections with its end engaging the flange thereof, and a nut-acting member having screw-threaded engagement with said sleeve and provided with an inturned flange that engages the flange of the other pipe section, said sleeve and nut, when tightened, pressing the flanges of said bushings and the flanges of the bushings and pipe sections into fluid-tight engagement, said bushings and their flanges being of a softer metal than said pipe sections, the relatively soft flanges of said bushings, under pressure, adapted to form fluid tight joints without the use of intervening packing.

ALBERT O. BREDESON.